United States Patent
Ishikawa et al.

(10) Patent No.: US 11,659,122 B2
(45) Date of Patent: May 23, 2023

(54) SHEET CONVEYANCE DEVICE AND METHOD FOR WRITING TO A WIRELESS TAG

(71) Applicant: TOSHIBA TEC KABUSHIKI KAISHA, Tokyo (JP)

(72) Inventors: Hiroyuki Ishikawa, Sunto Shizuoka (JP); Takashi Tomiyama, Sunto Shizuoka (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 298 days.

(21) Appl. No.: 17/152,521

(22) Filed: Jan. 19, 2021

(65) Prior Publication Data

US 2021/0229950 A1 Jul. 29, 2021

(30) Foreign Application Priority Data

Jan. 28, 2020 (JP) .............................. JP2020-011482

(51) Int. Cl.
*H04N 1/32* (2006.01)
*H04N 1/00* (2006.01)
*B65H 5/06* (2006.01)
*B65H 29/60* (2006.01)
*G06K 17/00* (2006.01)
*B65H 29/58* (2006.01)

(52) U.S. Cl.
CPC ......... *H04N 1/32138* (2013.01); *B65H 5/062* (2013.01); *B65H 29/60* (2013.01); *G06K 17/0025* (2013.01); *H04N 1/00342* (2013.01); *H04N 1/00612* (2013.01); *B65H 2553/52* (2013.01)

(58) Field of Classification Search
CPC .......... H04N 1/32138; H04N 1/00342; H04N 1/00612; B65H 2553/52; G06K 17/0025
See application file for complete search history.

(56) References Cited

U.S. PATENT DOCUMENTS

2006/0220859 A1* 10/2006 Nagai ........................ B41J 3/50
340/572.1
2010/0156615 A1* 6/2010 Ochiai ............... G06K 17/0025
340/10.51

(Continued)

FOREIGN PATENT DOCUMENTS

JP 2007164477 A 6/2007

*Primary Examiner* — Nicholas Pachol
(74) *Attorney, Agent, or Firm* — Kim & Stewart LLP

(57) ABSTRACT

A sheet conveyance device has a sheet conveyance path with a first path and a second path. A wireless tag communication device can write information to a wireless tag on a sheet on the first and second paths and receive responses from the wireless tag. A controller controls the wireless tag communication device to attempt to write information to the wireless tag while on the first path, then determines whether information has been written to the wireless tag on the first path according to a response received from the wireless tag. The controller switches a conveyance destination for the sheet to the second path if the information has not been written or to a discharge location if the information has been written. The controller then controls the wireless tag communication device to attempt to write information to the wireless tag while the sheet is on the second path.

20 Claims, 4 Drawing Sheets

(56) References Cited

U.S. PATENT DOCUMENTS

| | | | |
|---|---|---|---|
| 2010/0214592 A1* | 8/2010 | Muroi | B41J 3/50 |
| | | | 358/1.14 |
| 2019/0180155 A1* | 6/2019 | Takada | G06K 17/0025 |
| 2020/0293244 A1* | 9/2020 | Takada | G06F 3/1254 |
| 2022/0197733 A1* | 6/2022 | Tomiyama | G06F 11/0733 |

* cited by examiner

SHEET CONVEYANCE DEVICE AND METHOD FOR WRITING TO A WIRELESS TAG

CROSS-REFERENCE TO RELATED APPLICATION

This application is based upon and claims the benefit of priority from Japanese Patent Application No. 2020-011482, filed on Jan. 28, 2020, the entire contents of which are incorporated herein by reference.

FIELD

Embodiments described herein relate generally to a sheet conveyance device and a method of a sheet conveyance device.

BACKGROUND

In the related art, an image forming device that conveys a sheet from a paper feed cassette or a manual feed tray and then forms an image on the sheet is known. In some instances, a wireless tag may be provided on the sheet. To write information to a wireless tag on the sheet, the image forming device includes a wireless tag communication device.

The device writes information to a wireless tag while the sheet is being conveyed. Occasionally, information cannot be successfully written to the wireless tag depending on radio wave output conditions and the position of the sheet during the tag writing attempt. Thus, some sheets for which writing information to the wireless tag has succeeded and some for which writing has failed can be discharged.

However, when the writing of information to the wireless tag has failed, the sheet with the wireless tag cannot be used. Therefore, if there is a lot of failures in the writing of the information to wireless tags, the number of sheets that cannot be used increases accordingly, and a printed matter cannot be generated effectively.

DETAILED DESCRIPTION

In general, according to one embodiment, a sheet conveyance device includes a sheet conveyance path, along which a sheet can be conveyed along a first path part and a second path part for return to the first path part. A wireless tag communication device is configured to write information to a wireless tag on the sheet while the sheet is on the first path part and the second path part. The wireless tag communication device also receives responses from the wireless tag. A controller is configured to control the wireless tag communication device to attempt to write information to the wireless tag while the sheet is on the first path part. The controller then determines whether information has been written to the wireless tag while the sheet was on the first path part. Whether the information has been written to the wireless tag can be determined according to a response received from the wireless tag by the wireless communication device. The controller is configured to switch a conveyance destination of the sheet to the second path part when the information has not been written to the wireless tag while on the first path part and to a discharge location when the information has been written to the wireless tag. The controller controls the wireless tag communication device to attempt to write information to the wireless tag while the sheet is on the second path part.

In general, a sheet conveyance device of an embodiment can more effectively generate printed matter since even when writing of information on a wireless tag has initially failed, the writing of the information can be attempted again on the wireless tag. Hereinafter, an image forming device encompassing a sheet conveyance device of an embodiment is described. In the following description, configurations having the same or substantially similar functions are designated by the same reference symbols.

Figure 1:
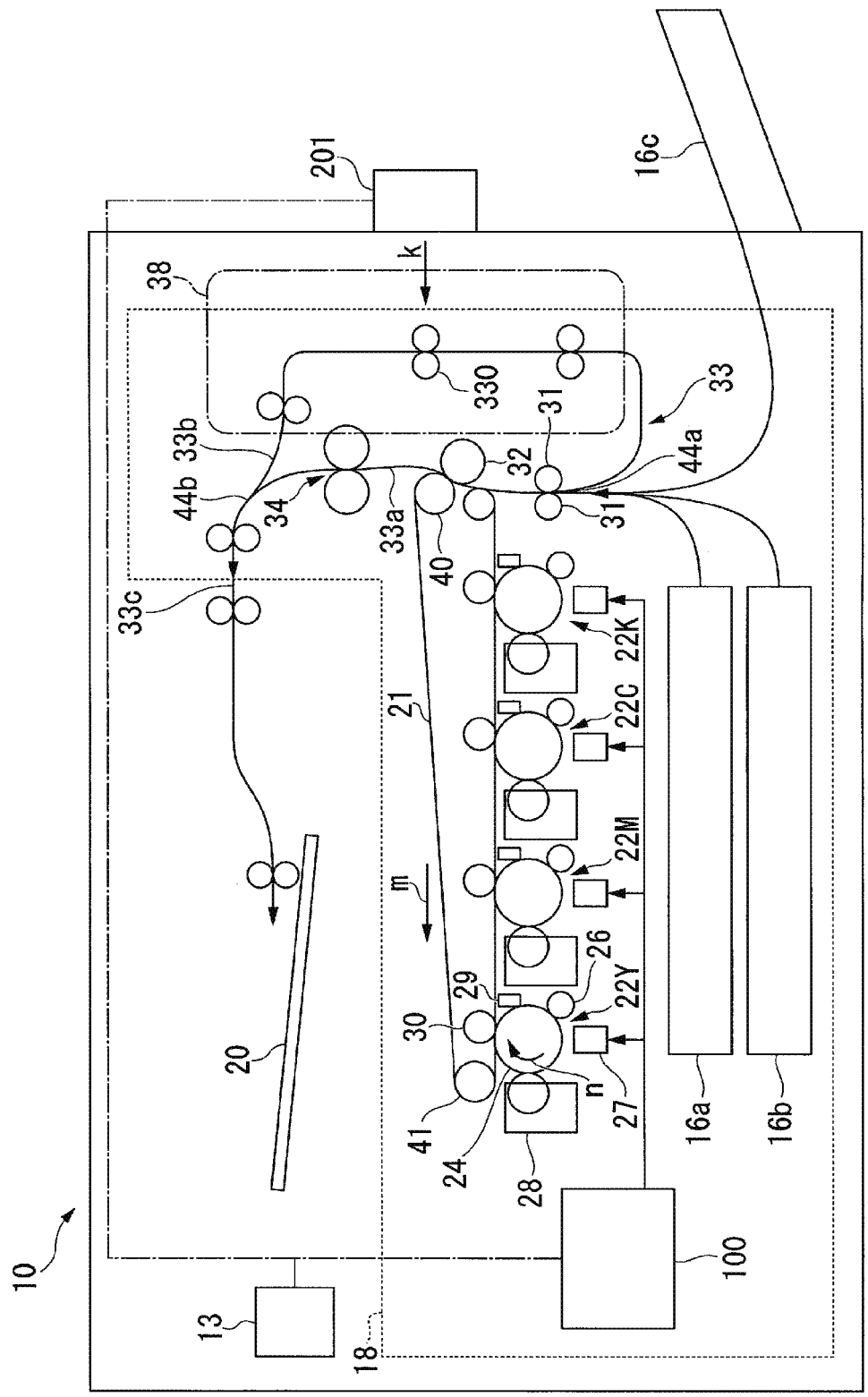
FIG. 1 depicts an image forming device of an embodiment.

First, with reference to FIG. 1, a configuration of an image forming device 10 is described. FIG. 1 is an explanatory diagram illustrating an example of the configuration of the image forming device 10 of an embodiment.

In FIG. 1, the image forming device 10 includes a control panel 13, a wireless tag communication device 201, and a printer unit 18. The printer unit 18 includes a controller 100, and paper feed cassettes 16a, 16b. The controller 100 controls the control panel 13, the wireless tag communication device 201, and the printer unit 18. The controller 100 also controls the conveyance of a sheet through the printer unit 18. In this context, controlling of the conveyance of a sheet refers to controlling the conveyance timing for the sheet, a stop position for the sheet, a conveyance speed for the sheet, and the like.

The control panel 13 includes an input key and a display unit. For example, the input key receives an input from the user. For example, the display unit is a touch panel type. The display unit receives an input from the user and displays information to the user. For example, the control panel 13 displays items relating to the operation of the image forming device 10 to be set or selected by the user. The control panel 13 notifies the controller 100 of the items set or selected by the user.

The paper feed cassettes 16a and 16b each store sheets provided with wireless tags thereon or therein. One or both of the paper feed cassettes 16a and 16b can also store sheets without wireless tags. In the following description, unless particularly described otherwise, each sheet is a sheet provided with a wireless tag. For example, a material such as paper or a plastic film can be used for the sheets.

The printer unit 18 performs operations for forming an image on a sheet. For example, the printer unit 18 forms an image corresponding to image data on the sheet. In the following description, forming an image on a sheet is also referred to as printing. In the present embodiment, the printer unit 18 is a device of fixing a toner image to the sheets. However, the embodiments are not limited thereto, for example, the printer unit 18 may instead be an inkjet type device.

The printer unit 18 of the present example includes an intermediate transfer belt 21. The printer unit 18 supports the intermediate transfer belt 21 with a driven roller 41, a backup roller 40, and the like. The printer unit 18 rotates the intermediate transfer belt 21 in an arrow m direction. The printer unit 18 includes four sets of image forming stations 22Y, 22M, 22C, and 22K. The image forming stations 22Y, 22M, 22C, and 22K correspond to yellow (Y), magenta (M), cyan (C), and black (K), respectively. The image forming stations 22Y, 22M, 22C, and 22K are disposed along the rotation direction of the intermediate transfer belt 21 to be on the lower side of the intermediate transfer belt 21.

Hereinafter, among the image forming stations 22Y, 22M, 22C, and 22K, the yellow (Y) image forming station 22Y is explained as an example. The image forming stations 22M, 22C, and 22K include, other than with respect to toner color, configurations and functions the same as the image forming station 22Y, and thus the detailed description thereof can be omitted.

The image forming station 22Y includes an electrostatic charger 26, an exposure scanning head 27, a developing device 28, and a cleaner 29. The electrostatic charger 26, the exposure scanning head 27, the developing device 28, and the cleaner 29 are disposed around a photoconductive drum 24 that rotates in an arrow n direction.

The image forming station 22Y includes a primary transfer roller 30. The primary transfer roller 30 is disposed to face the photoconductive drum 24 via the intermediate transfer belt 21.

The electrostatic charger 26 uniformly charges the photoconductive drum 24. The exposure scanning head 27 selectively exposes the uniformly charged photoconductive drum 24 and thereby forms an electrostatic latent image on the photoconductive drum 24. The developing device 28 then develops the electrostatic latent image formed on the photoconductor drum 24 by using a two-component developer formed with a toner and a carrier.

The primary transfer roller 30 transfers the toner image formed on the photoconductive drum 24 to the intermediate transfer belt 21. Separate primary transfer rollers 30 are provided for each the image forming stations 22Y, 22M, 22C, and 22K. A color toner image is formed on the intermediate transfer belt 21. The color toner image is formed by sequentially overlapping toner images of yellow (Y), magenta (M), cyan (C), and black (K).

The cleaner 29 removes the toner remaining on the photoconductive drum 24 after the primary transfer.

The printer unit 18 includes a secondary transfer roller 32. The secondary transfer roller 32 is disposed to face the backup roller 40 via the intermediate transfer belt 21. The secondary transfer roller 32 transfers the color toner image from the intermediate transfer belt 21 to the sheet. In the following description, the expression "toner image" may refer to either a color toner image or a toner image of just one color. The toner image may also be a toner image using a decolorable-type toner. The conveyance path 33 is the path along which a sheet is conveyed by a plurality of conveyance rollers (for example, conveyance rollers 330) disposed along the path. The conveyance path 33 includes a first conveyance path 33a, a second conveyance path 33b, and a third conveyance path 33c. The conveyance paths 33a, 33b, and 33c each include conveyance rollers thereon. The first conveyance path 33a is from a confluence portion 44a to a branch portion 44b. The second conveyance path 33b passes through a double-sided printing device 38 and is from the branch portion 44b to the confluence portion 44a. The third conveyance path 33c is from the branch portion 44b to a discharge tray 20.

A sheet is extracted from any one of the paper feed cassette 16a, the paper feed cassette 16b, or a manual feed tray 16c. The extracted sheet is then temporarily stopped at the two stopped registration rollers 31. At this point, the leading edge of the sheet abuts against the registration rollers 31 and any angle of the sheet can be corrected.

The controller 100 starts the rotation of the registration rollers 31 according to the position of the toner image on the rotating intermediate transfer belt 21 so that the sheet moves to the secondary transfer roller 32 to meet the toner image for transfer. The toner image formed on the intermediate transfer belt 21 is transferred to the sheet by the secondary transfer roller 32. The transferred toner image is then fixed to the sheet by a fixing device 34. In this manner, an image is formed on a sheet by the control of the controller 100. The controller 100 can then convey the printed sheet to the third conveyance path 33c for discharge.

The wireless tag communication device 201 includes and an antenna 302 (see FIG. 3) and a communication control circuit 301 (see FIG. 3) with a storage device or the like.

The wireless tag according to the present embodiment is, for example, a radio frequency identification (RFID) tag. The wireless tag communication device 201 transmits radio waves, for example, in an arrow k direction. The wireless tag communication device 201 communicates with the wireless tag provided on the sheet via the antenna. Specifically, the wireless tag communication device 201 reads information from the wireless tag and writes information to the wireless tag.

In a case where a sheet is to be used for distribution purposes and the like, the information written to the wireless tag can include information indicating contents of a package, information indicating a destination, the information to be printed on the sheet, and the like.

According to the present embodiment, the wireless tag communication device 201 uses, for example, a radio wave system (UHF) of a 900 MHz band. However, the RFID system and frequency band are not limited to this, and other systems and frequency bands can also be employed.

Subsequently, an operation of a sheet in case of double-sided printing is described.

Figure 2:
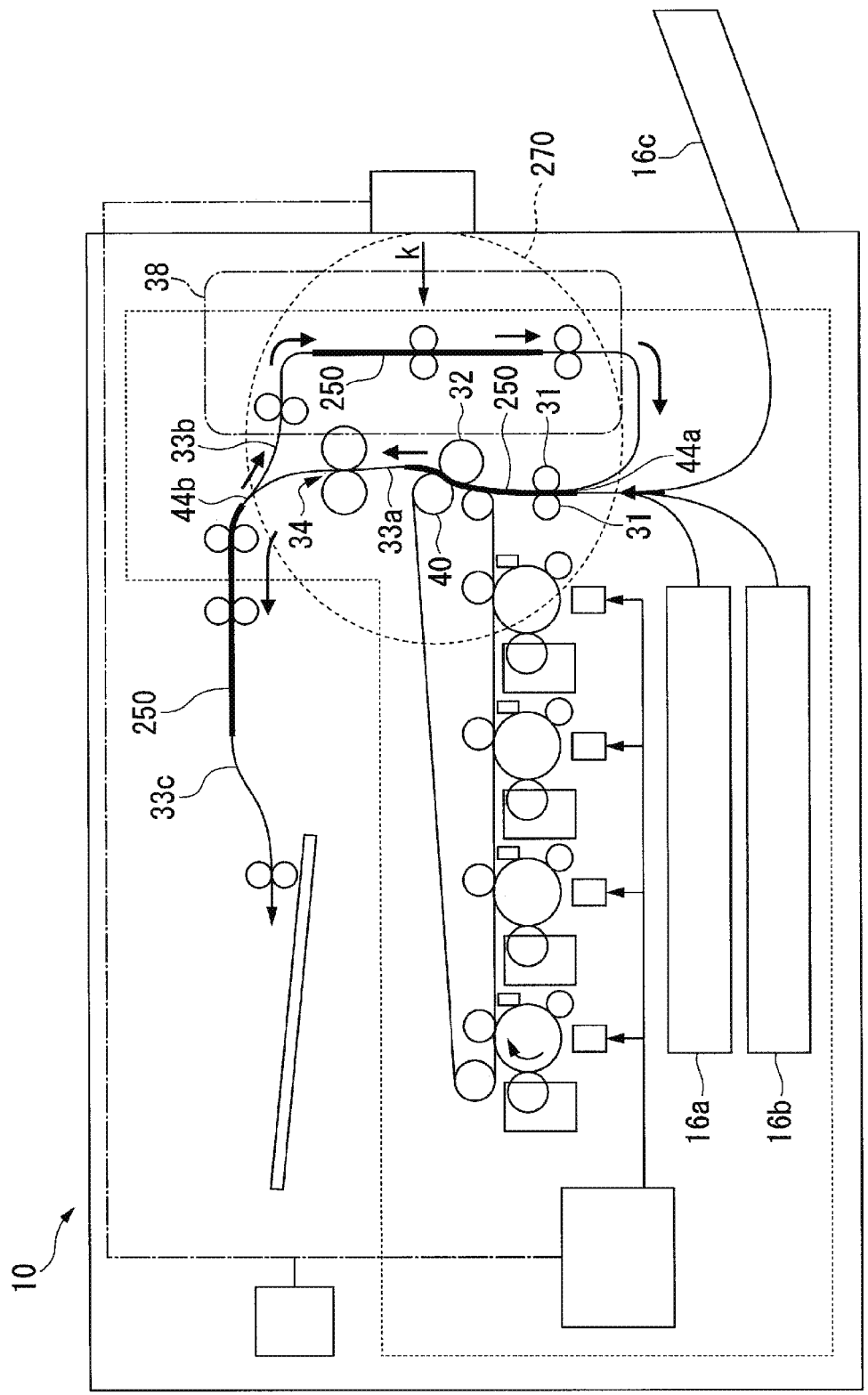
FIG. 2 depicts aspects of a double-sided printing process.

FIG. 2 is an explanatory diagram illustrating an example of an operation of a sheet in case of double-sided printing.

In case of double-sided printing, a sheet 250 extracted from one of the paper feed cassette 16a, the paper feed cassette 16b, or the manual feed tray 16c is conveyed along the first conveyance path 33a. Next, any angle of sheet 250 is corrected at the registration rollers 31. The sheet 250 is then conveyed to the position of the secondary transfer roller 32 according to the position of the toner image formed on the intermediate transfer belt 21. The toner image on the intermediate transfer belt 21 is transferred to a first surface side of the sheet 250 by the secondary transfer roller 32. Then, the toner image on the first surface side of the sheet 250 is fixed to the sheet 250 by the fixing device 34.

The sheet 250 (which now has an image printed on its first surface side) next enters the third conveyance path 33c. By the control of the controller 100, this sheet 250 is switched back and conveyed along the second conveyance path 33b. The sheet 250 is returned to the confluence portion 44a via the second conveyance path 33b through the double-sided printing device 38. The sheet 250 is thus returned to the first conveyance path 33a via the registration rollers 31. Accordingly, a sheet 250 that passes through the second conveyance path 33b is returned to the first conveyance path 33a so that its second surface side will now face the intermediate transfer belt 21.

Another toner image formed on the intermediate transfer belt 21 can now be transferred to the second surface side of the sheet 250 by the secondary transfer roller 32. The toner image transferred to the second surface side of the sheet 250 is then fixed to the sheet 250 by the fixing device 34. The sheet 250 (now printed on both first and second surface sides) passes through the third conveyance path 33c and can be sent to the discharge tray 20.

In FIG. 2, a communication area 270 (dashed line) indicates an area (range) in which the wireless tag communication device 201 is able to successfully communicate with a wireless tag provided on a sheet. The communication area 270 is such that it includes a portion of the first conveyance path 33a and a portion of the second conveyance path 33b.

Figure 3:
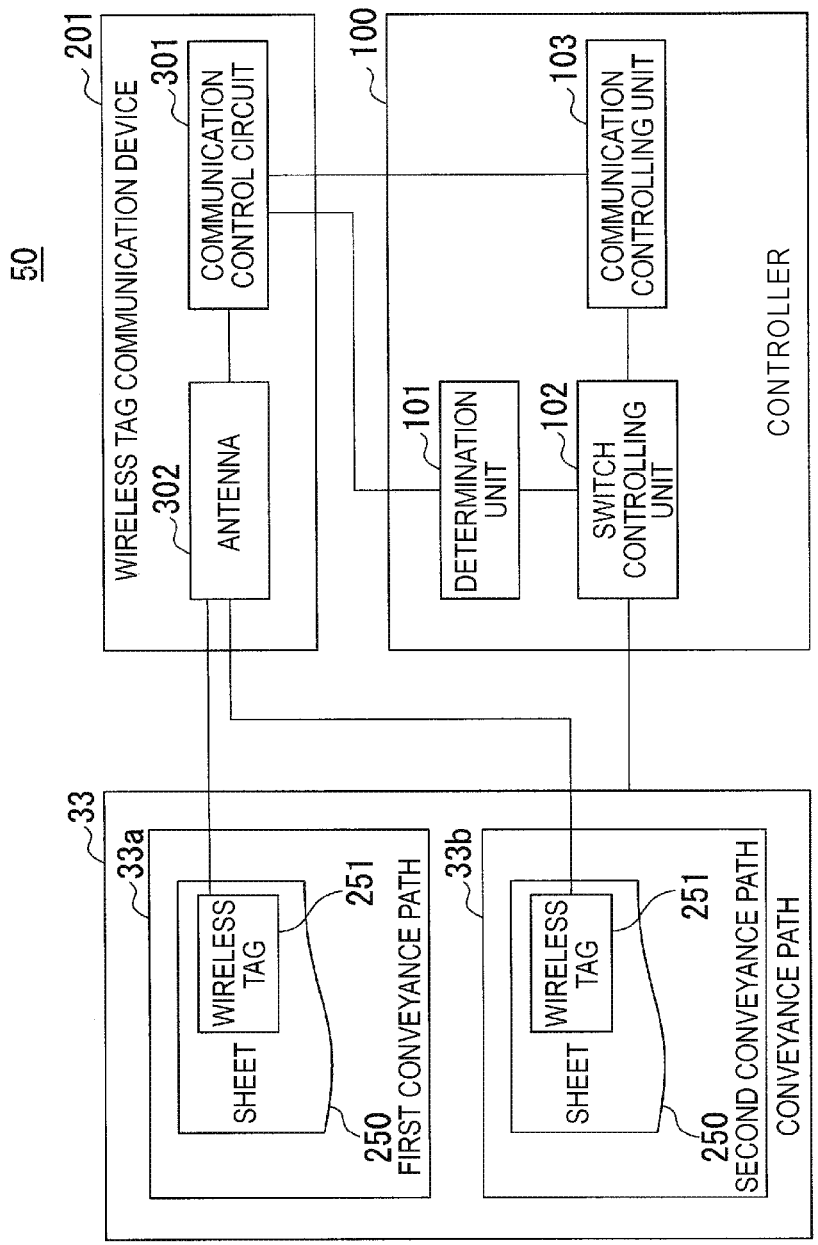
FIG. 3 is a block diagram illustrating aspects related to a sheet conveyance device.

Aspects of a what can be considered a sheet conveyance device 50 included within an image forming device 10 are described by reference to FIG. 3. In general, sheet conveyance device 50 can be a standalone device, distinct from an image forming apparatus, or may be incorporated within or encompassed by an image forming apparatus or other apparatus. FIG. 3 is a block diagram illustrating an example of a functional configuration of a sheet conveyance device 50 according to the present embodiment.

In FIG. 3, the sheet conveyance device 50 includes the controller 100, the wireless tag communication device 201, and the conveyance path 33 (including at least the first conveyance path 33a and second conveyance path 33b). The controller 100 controls the wireless tag communication device 201 according to a stored sheet conveyance program stored. The communication between the controller 100 and the wireless tag communication device 201 may be via a wired communication path or may be by wireless communication, such as Bluetooth® Low Energy (BLE).

The controller 100 can comprise, for example, by a central processing unit (CPU) and/or an application specific integrated circuit (ASIC). A storage device within the controller can be a read only memory (ROM), a random access memory (RAM), a hard disk drive (HDD), a solid-state drive (SSD), or the like.

If a sheet 250 is on the first conveyance path 33a, the wireless tag communication device 201 can write information to a wireless tag 251 provided on the sheet 250. The wireless tag communication device 201 controls the communication control circuit 301 and attempts, at regular intervals (for example, 10 msec intervals), a reading an ID of the wireless tag 251 on the sheet 250 within the communication area 270 (see FIG. 2). Specifically, the wireless tag communication device 201 transmits signals (interrogation waves) at regular intervals from the antenna 302. If these signals are received, any wireless tag 251 present in the communication area 270 obtains electric power and is activated so as to respond. The wireless tag 251 transmits a response wave including ID data previously stored in the wireless tag 251. Accordingly, when the wireless tag communication device 201 receives a response wave from a wireless tag 251 the wireless tag communication device 201 obtains ID data for the wireless tag 251.

The wireless tag communication device 201 can communicate with the controller 100. The wireless tag communication device 201 receives a response waves from a wireless tag 251 at regular intervals and thus transmits the received response waves to the controller 100.

As illustrated in FIG. 2, the conveyance path 33 includes the first conveyance path 33a and the second conveyance path 33b. The first conveyance path 33a is initially used for performing first surface side printing on the sheet 250. The second conveyance path 33b is used for returning the sheet 250 for second surface side printing.

However, according to the present embodiment, the second conveyance path 33b need only be a path different from the first conveyance path 33a in some portion.

Here, even if the sheet 250 is present inside the communication area 270, the information may not always be successfully read from or written to the wireless tag 251. This is because various metallic components and dielectrics can be disposed inside the conveyance device 50 (or image forming apparatus 10), so that the radio wave transmission may become unstable at certain times or to particular locations nominally within the communication range 270. The communication may also be complicated due to the type of the sheet 250, the type of the wireless tag 251, the position of the wireless tags 251, or the like.

However, in this embodiment, even if writing to the wireless tag 251 failed initially, the controller 100 can attempt writing again.

The controller 100 includes a determination unit 101, a switch controlling unit 102, and a communication controlling unit 103. The present embodiment is not limited to any particular configuration of units 101, 102, and 103. For example, these units are not necessarily included inside the controller 100, but may be provided as separate controlling units (e.g., other CPUs, ASICs, or the like) from outside the controller 100. However, in the present example, the units 101, 102, and 103 are implemented by configuration of a processor of controller 100 executing a stored program.

The determination unit 101 is configured to determine whether information has been successfully written to the wireless tag 251. For example, the determination unit 101 determines whether the information was written to the wireless tag 251 while on the first conveyance path 33a. Specifically, after the wireless tag communication device 201 performs a process of writing information to the wireless tag 251, the determination unit 101 then determines whether a response indicating that the writing of the information has succeeded is returned from the wireless tag 251. If the determination unit 101 determines a response indicating that the writing of the wireless tag communication device 201 has failed or the wireless tag communication device 201 does not receive any response from the wireless tag 251 within a predetermined period of time, the determination unit 101 determines that the information has not been successfully written to the wireless tag 251 (that is, the writing failed).

The determination unit 101 determines whether the sheet 250 is on the first conveyance path 33a. For example, the determination unit 101 may determine that the sheet 250 is on the first conveyance path 33a based on the timing at which the sheet 250 was extracted from one of the paper feed cassette 16a, the paper feed cassette 16b, or the manual feed tray 16c.

If the determination unit 101 determines that the information was not written to the wireless tag 251, the switch controlling unit 102 then causes the conveyance destination of the sheet 250 to be switched to the second conveyance path 33b. Specifically, if the determination unit 101 determines that the information was not successfully written to the wireless tag 251 while on the first conveyance path 33a, the switch controlling unit 102 causes the sheet 250 to transported on the second conveyance path 33b. Specifically, if the writing of information to the wireless tag 251 failed for the sheet 250 on the first conveyance path 33a, the switch controlling unit 102 causes the conveyance rollers of the second conveyance path 33b and the third conveyance path 33c and the branch portion 44b to put the sheet 250 through the double-sided printing device 38 (that is, puts the sheet 250 on the second conveyance path 33b).

However, if the determination unit 101 determines that the information was successfully written to the wireless tag 251, the switch controlling unit 102 causes that the conveyance destination of the sheet 250 to be the third conveyance path 33c for discharge. Specifically, if the determination unit 101 determines that the information was written to the wireless tag 251 on the first conveyance path 33a, that is, the writing to the wireless tag 251 succeeded, the switch controlling unit 102 causes the sheet 250 to be placed on the third conveyance path 33c. In this case, the sheet 250 is discharged to the discharge tray 20 via the third conveyance path 33c.

Once the sheet 250 is on the second conveyance path 33b, the communication controlling unit 103 controls the wireless tag communication device 201 so as to attempt writing of information to the wireless tag 251 again. That is, the communication controlling unit 103 controls the wireless tag communication device 201 so that a second writing is attempted. The wireless tag communication device 201 attempts to write information to the wireless tag 251 on the second conveyance path 33b in response to the control of the communication controlling unit 103.

The communication controlling unit 103 determines whether the sheet 250 with the wireless tag 251 in on the second conveyance path 33b for writing. Specifically, the communication controlling unit 103 may determine that the sheet 250 moves onto the second conveyance path 33b based on the timing of the switching back operation or the like.

In this example, the second conveyance path 33b is closer to the wireless tag communication device 201 than is the first conveyance path 33a. That is, the second conveyance path 33b would be expected to provide a better communication state for the wireless tag communication device 201 than would the first conveyance path 33a. Therefore, the writing success on the second conveyance path 33b (second writing attempt) should be improved as compared with the first conveyance path 33a (first writing attempt).

(Third Writing)

If writing of information on the first conveyance path 33a has failed, the determination unit 101 next determines whether the information was written to the wireless tag 251 while on the second conveyance path 33b. If the determination unit 101 determines the wireless tag 251 was not successfully written while on the second conveyance path 33b (that is, the second writing attempt failed), the communication controlling unit 103 may control the wireless tag communication device 201 such that another writing attempt on the wireless tag 251 can be made when the sheet 250 is on the first conveyance path 33a again (after return via the second conveyance path 33b). That is, the communication controlling unit 103 controls the wireless tag communication device 201 and attempts a third writing.

(Case where Third Writing Failed)

If the third writing fails, the controller 100 performs a notification that there is an error on the wireless tag 251. This notification can be provided by printing on the sheet 250 provided with the wireless tag 251. However, this notification may also or instead be a notification made by display of a message on the display unit included in the image forming device 10 or notification(s) on display units of other devices such as a personal computer connected to the image forming apparatus 10. If the third writing fails, the controller 100 may discharge the sheet 250 to a discharge tray 20 different from the discharge tray 20 to which the other sheets 250 for which the tag writing has succeeded are discharged.

According to the present embodiment, if the third writing fails, the image forming device 10 discharges the sheet 250 to a discharge tray 20, but the present embodiment is not limited to this. For example, if the third writing fails, a fourth and/or a fifth writing may be attempted. Specifically, if the third writing to the wireless tag 251 failed, the switch controlling unit 102 may again return the sheet 250 to the second conveyance path 33b for further writing attempts.

In this case, the communication controlling unit 103 may control the wireless tag communication device 201 so that a fourth writing is attempted on the wireless tag 251 while on the second conveyance path 33b. If the fourth writing fails, the communication controlling unit 103 may perform control so that a fifth writing is attempted on the wireless tag 251 while on the first conveyance path 33a again.

If the writing continues to fail, the number of attempts for further writing (the number of retry times) may be any number of times set by the user or otherwise.

According to the present embodiment, if the first writing failed, the sheet 250 is caused to pass through the second conveyance path 33b (e.g., a path for second surface printing). Thus, if the sheet 250 that passes through the second conveyance path 33b for this second attempt is discharged to the discharge tray 20 without any other change, then sheet 250 will be discharged so that its front (first side) and back (second side) surfaces are reversed from other sheets 250 that were not passed back through the second conveyance path 33b for an additional tag writing attempt.

Therefore, the sheet 250 to which tag writing was retried may be caused to further pass through the second conveyance path 33b so as to be oriented in the same manner as other discharged sheets 250. Accordingly, the sheet 250 to which writing is retried can be discharged to the discharge tray 20 so that that the front and back surfaces thereof match with the other sheets 250 by sending the sheet back through second conveyance path 33b.

(Process Relating to Writing of Information to the Wireless Tag 251)

Figure 4:
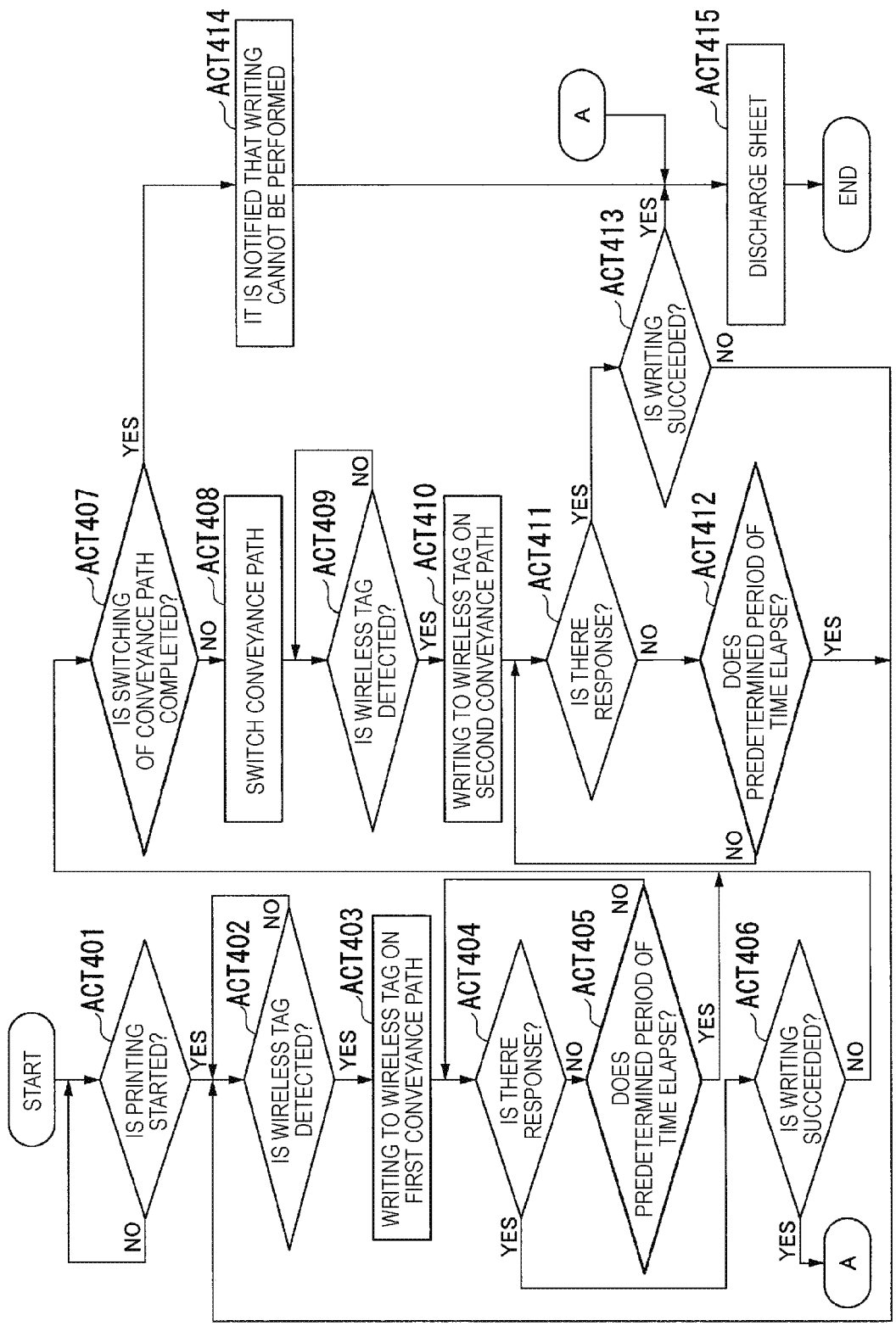
FIG. 4 is a flowchart of a process relating to writing of information to a wireless tag using an image forming device.

A process relating to the writing of information to the wireless tag 251 by the image forming device 10 (or the sheet conveyance device 50) is described by reference to FIG. 4. FIG. 4 is a flowchart illustrating an example of a process relating to the writing of information to the wireless tag 251.

In FIG. 4, the controller 100 determines whether printing has been started (Act 401). The printing described here is, for example, printing on one of the stored sheets 250. The controller 100 waits (No in Act 401) for the start of the printing. If the printing is started (Yes in Act 401), the controller 100 determines whether the wireless tag 251 is detected (Act 402). The controller 100 controls the wireless tag communication device 201 in response to the start of the printing and starts the reception process for response waves from a wireless tag 251 together with the start of the transmission of signals (interrogation waves) at regular intervals.

In Act 402, it is determined whether a response wave from a wireless tag 251 on the sheet 250 on the first conveyance path 33a has been received by the wireless tag communication device 201. If the wireless tag communication device 201 does not detect a wireless tag 251 on the first conveyance path 33a, the controller 100 waits (No in Act 402). However, if the wireless tag communication device 201 detects the wireless tag 251 (Yes in Act 402), the image forming device 10 controls the wireless tag communication device 201 and writes information to the wireless tag 251 of a sheet 250 positioned on the first conveyance path 33a (Act 403).

The controller 100 then determines whether there is a response from the wireless tag 251 (Act 404). If there is not a response from the wireless tag 251 (No in Act 404), the controller 100 then determines whether a predetermined period of time has elapsed (Act 405). The predetermined period of time in Act 405 is several seconds, for example. The timing for starting the measurement of the predetermined period of time in Act 405 may be for the time at which the writing process to the wireless tag 251 in Act 403 is performed or may be for the at which printing started in Act 401.

If the predetermined period of time has not yet elapsed (No in Act 405), the controller 100 returns to Act 404. Once the predetermined period of time elapses (Yes in Act 405), the controller 100 proceeds to Act 407. In Act 404, if there is a response from the wireless tag 251 (Yes in Act 404), the controller 100 then determines whether the response indicates that the writing has succeeded (Act 406). If the response indicates that the writing has succeeded (Yes in Act 406), the controller 100 proceeds to Act 415 (via the process route label with "A" in FIG. 4).

If the response does not indicate that the writing succeeded (No in Act 406), that is, the response indicates that the writing is failed, the controller 100 next determines whether the switching of the conveyance path 33 has been completed (Act 407). If the switching of the conveyance path 33 is not completed (No in Act 407), the conveyance path 33 is switched for another writing attempt (Act 408). Specifically, the controller 100 switches the conveyance path 33 so that the sheet 250 passes through the second conveyance path 33b.

The controller 100 next determines whether the wireless tag 251 is detected (by receipt of response waves) on the second conveyance path 33b (Act 408).

If the wireless tag communication device 201 does not detect the wireless tag 251, controller 100 waits (No in Act 409). However, if the wireless tag communication device 201 detects the wireless tag 251 (Yes in Act 409), the controller 100 controls the wireless tag communication device 201 to write information to the wireless tag 251 while on the second conveyance path 33b (a second writing attempt) (Act 410).

The controller 100 then determines whether there is a response from the wireless tag 251 (Act 411). In Act 411, if there is not a response from the wireless tag 251 (No in Act 411), the image forming device 10 next determines whether a predetermined period of time has elapsed (Act 412). The predetermined period of time in Act 412 is several seconds, for example. The timing for starting the measurement of the predetermined period of time in Act 412 may be the time at which the writing process to the wireless tag 251 in Act 410 was performed or may be for a time from a starting of printing in Act 401.

If the predetermined period of time has not yet elapsed (No in Act 412), the controller 100 returns to Act 411. If the predetermined period of time elapses (Yes in Act 412), the controller 100 returns to Act 402. After the return to Act 402, writing in Act 403 is performed again, but the writing in this case is the third writing attempt.

In Act 411, if there is a response from the wireless tag 251 (Yes in Act 411), the image forming device 10 determines whether the response indicates that the writing succeeded (Act 413). If the response indicates the writing succeeded (Yes in Act 413), the controller 100 proceeds to Act 415.

If the response does not indicate that the writing succeeded (No in Act 413), that is, the response indicates that the writing failed, the controller 100 returns to Act 402. After the return to Act 402, writing can be performed again in Act 403, but the writing in this case is the third writing attempt.

In Act 407, the switching of the conveyance path 33 is completed (YES in Act 407), that is, the third writing is failed and additional writing attempts to the wireless tag 251 will not be made, the tag writing failure is notified to the user or otherwise to indicated that the tag writing cannot be successfully performed (Act 414). This notification is, for example, a notification made by printing on the sheet 250 provided with the wireless tag 251. The controller 100 thus switches the conveyance destination of the sheet 250 to the third conveyance path 33c and discharges the sheet 250 from the discharge tray 20 via the third conveyance path 33c (Act 415), and the series of processes ends.

According to the above embodiment, if the information is not written to the wireless tag 251 on the first conveyance path 33a, the sheet 250 is switched back to the second conveyance path 33b, and the information is attempted to be written to the wireless tag 251 on the second conveyance path 33b. That is, even if the first writing of the information to the wireless tag 251 failed, writing of the information can be performed again. Accordingly, the generation of sheets 250 that cannot be used due tag writing failures can be reduced. Therefore, printed matter can be more effectively generated with an image forming device 10 according to the present embodiment.

According to the present embodiment, if the information is not written to the wireless tag 251 on the second conveyance path 33b, the image forming device 10 returns the sheet 250 to the first conveyance path 33a and writes the information to the wireless tag 251 while on the first conveyance path 33a. That is, if the second writing fails, a third writing is performed. Accordingly, the generation of sheets 250 that cannot be used due to the failure in the writing of information to the wireless tags 251 can be suppressed. Therefore, the printed matter can be generated more effectively.

According to the present embodiment, the first conveyance path 33a is for performing printing and the second conveyance path 33b is for performing the back side printing. Accordingly, without separately providing a conveyance path for reading and writing information from and to a wireless tag 251, information can be read from and written to the wireless tag 251 using just the conveyance path 33 found in image forming apparatus 10. That is, without specifically providing a so-called back feed function for returning paper to a tag reading/writing position by reversing the rotation of conveyance rollers or the like, information can be read from or written to a wireless tag 251, multiple writing attempts on a wireless tag 251 can be made using the second conveyance path 33b that is already provided for performing back side printing.

According to the present embodiment, the second conveyance path 33b is disposed at a position closer to the wireless tag communication device 201 than is the first conveyance path 33a. Accordingly, a communication distance to the wireless tag 251 when on the second conveyance path 33b is shorter. Therefore, of the success rate of writing on the second conveyance path 33b (second writing) can be increased as compared to the writing on the first conveyance path 33a (first writing).

Certain functions of a sheet conveyance device 50 according to an embodiment may be realized with a computer executing a software algorithm or the like. In this case, a program for realizing the functions of the sheet conveyance device 100 may be recorded on a non-transitory computer-readable recording medium, and such a program may be executed by a computer system. The expression "the computer system" can include a computer, an operating system (OS), and hardware such as a peripheral device or devices connected to the computer. The expression "computer-readable recording medium" refers to a portable medium such as a flexible disk, a magneto-optical disk, a ROM, a CD-ROM, or a storage device such as a hard disk built in a computer system.

A "computer-readable recording medium" may furthermore be a peripheral device or a server connected to the computer. In such cases, the above-described program may be accessed, downloaded, or otherwise provided via a communication line or a network, such as the Internet. The above-described program may realize a portion of its described functions in combination with another program recorded in the computer system in advance.

While certain embodiments have been described, these embodiments have been presented by way of example only, and are not intended to limit the scope of the inventions. Indeed, the novel embodiment described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A sheet conveyance device, comprising:
   a sheet conveyance path along which a sheet can be conveyed along a first path part and a second path part for return to the first path part;
   a wireless tag communication device configured to write information to a wireless tag on the sheet while on the first path part and the second path part and receive responses from the wireless tag; and
   a controller configured to:
   control the wireless tag communication device to attempt to write information to the wireless tag while on the first path part;
   determine whether information has been written to the wireless tag while on the first path part according to a response from the wireless tag to the wireless communication device;
   switch a conveyance destination of the sheet to the second path part when the information has not been written to the wireless tag while on the first path part and to a discharge location when the information has been written to the wireless tag; and
   control the wireless tag communication device to attempt to write information to the wireless tag while the sheet is on the second path part.

2. The sheet conveyance device according to claim 1, wherein the controller is further configured to:
   determine whether the information has been written to the wireless tag while on the second path part, and
   if the information has not been written to the wireless tag while on the second path part, control the wireless tag communication device to attempt to write the information to the wireless tag again when the sheet is returned to the second path part via the first path part.

3. The sheet conveyance device according to claim 1, further comprising:
   a fixing device along the first path part and configured to fix a toner image to the sheet; and
   a printing unit along the first path part and configured to transfer a toner image to the sheet.

4. The sheet conveyance device according to claim 3, further comprising:
   a sheet reversing unit, wherein
   the second path part passes through the sheet reversing unit.

5. The sheet conveyance device according to claim 1, further comprising:
   a sheet reversing unit, wherein
   the second path part passes through the sheet reversing unit.

6. The sheet conveyance device according to claim 1, wherein the second path part is closer to the wireless tag communication device than is the first path part.

7. The sheet conveyance device according to claim 1, wherein the wireless tag communication device includes an antenna.

8. The sheet conveyance device according to claim 1, wherein
   the first path part is for printing on a first side of the sheet, and
   the second path part is for returning the sheet to the first path part for printing on a second side of the sheet.

9. An image forming apparatus, comprising:
   a sheet conveyance path along which a sheet can be conveyed, the sheet conveyance path including:
   a first path part for printing on a first side of the sheet, and
   a second path part for returning the sheet to the first path part for printing on a second side of the sheet;
   a wireless tag communication device configured to write information to a wireless tag on the sheet while on the first path part and the second path part and to receive responses from the wireless tag; and
   a controller configured to:
   control the wireless tag communication device to attempt to write information to the wireless tag while on the first path part;
   determine whether information has been written to the wireless tag while on the first path part according to a response from the wireless tag to the wireless communication device;
   switch a conveyance destination of the sheet to the second path part when the information has not been written to the wireless tag while on the first path part and to a discharge location when the information has been written to the wireless tag; and
   a control the wireless tag communication device to attempt to write information to the wireless tag while the sheet is on the second path part.

10. The image forming apparatus according to claim 9, wherein the controller is further configured to:
    determine whether the information has been written to the wireless tag while on the second path part, and
    if the information has not been written to the wireless tag while on the second path part, control the wireless tag communication device to attempt to write the information to the wireless tag again when the sheet is returned to the second path part via the first path part.

11. The image forming apparatus according to claim 9, further comprising:
    a fixing device along the first path part and configured to fix a toner image to the sheet; and
    a printing unit along the first path part and configured to transfer a toner image to the sheet.

12. The image forming apparatus according to claim 9, further comprising:
a sheet reversing unit, wherein
the second path part passes through the sheet reversing unit.

13. The image forming apparatus according to claim 9, wherein the second path part is closer to the wireless tag communication device than is the first path part.

14. The image forming apparatus according to claim 9, wherein the wireless tag communication device includes an antenna.

15. The image forming apparatus according to claim 9, further comprising:
a display screen, wherein
the controller is further configured to output a notification for display on the display screen if a predetermined number of writing attempts have been made on the wireless tag and without the information being successfully written to the wireless tag.

16. A sheet conveyance method for a sheet conveyance device including a wireless tag communication device to write information to a wireless tag on a sheet conveyed by the sheet conveyance device, the method comprising:
conveying a sheet on a first conveyance part of a sheet conveyance path, the sheet having a wireless tag;
controlling the wireless tag communication device to attempt to write information to the wireless tag while the sheet is on the first path part;
determining whether information has been written to the wireless tag while on the first path part according to a response from the wireless tag received by the wireless communication device;
switching a conveyance destination of the sheet to a second path part of the sheet conveyance path if the information has not been written to the wireless tag while on the first path part and to a discharge location if the information has been written to the wireless tag; and
controlling the wireless tag communication device to attempt to write information to the wireless tag while the sheet is on the second path part.

17. The sheet conveyance method according to claim 16, further comprising:
determining whether the information has been written to the wireless tag while on the second path part; and
if the information has not been written to the wireless tag while on the second path part, controlling the wireless tag communication device to attempt to write the information to the wireless tag again when the sheet is returned to the second path part via the first path part.

18. The sheet conveyance method according to claim 16, wherein the second path part is closer to the wireless tag communication device than is the first path part.

19. The sheet conveyance method according to claim 16, further comprising:
printing on a first side of the sheet when the sheet is on the first path part, wherein
the second path part passes through a sheet reversing unit.

20. The sheet conveyance method according to claim 16, further comprising:
outputting a notification after a predetermined number of attempts to write the information to the wireless tag have failed.

\* \* \* \* \*